Patented Dec. 30, 1952

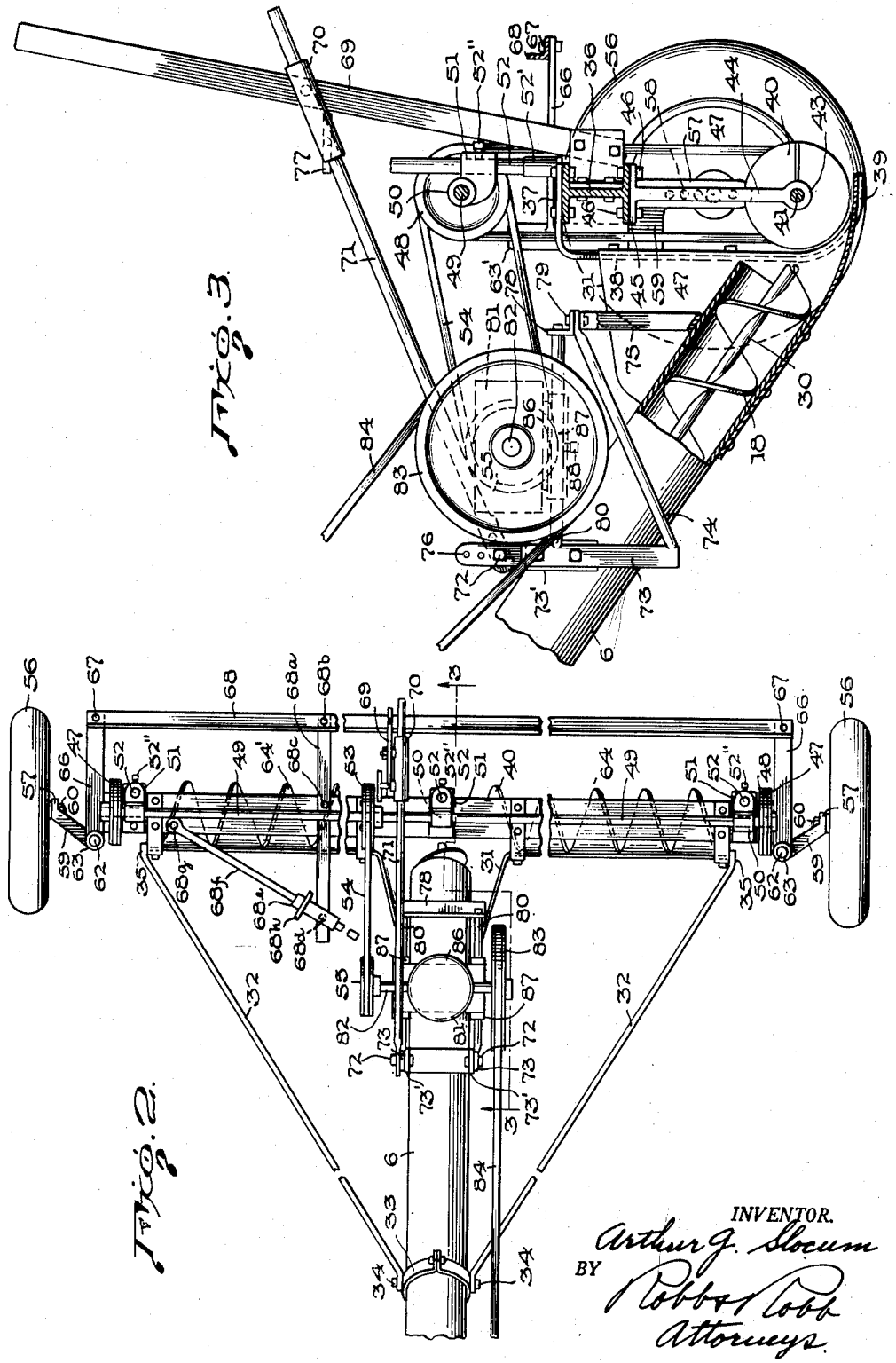

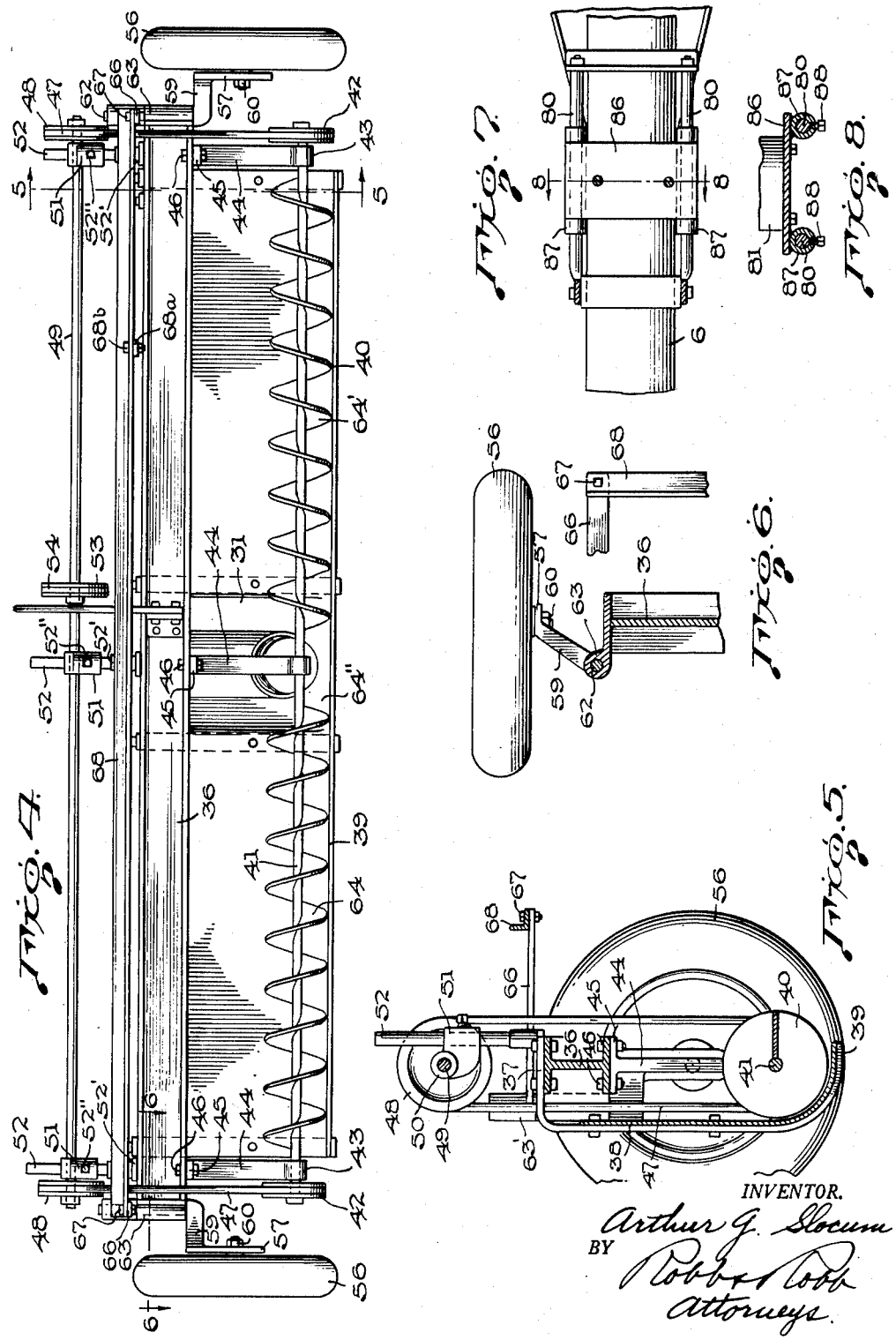

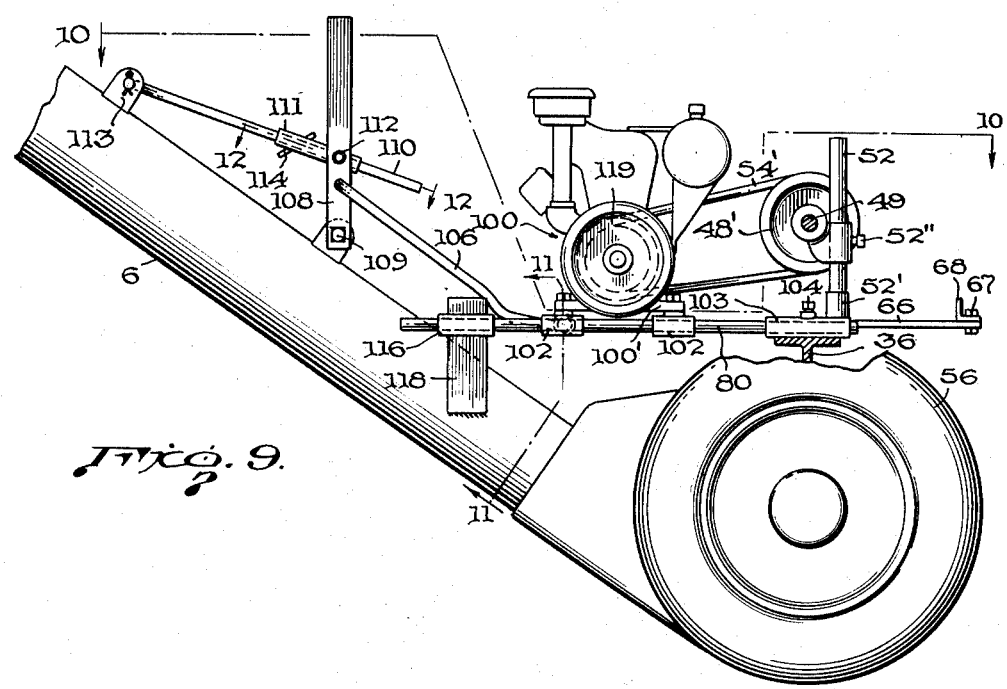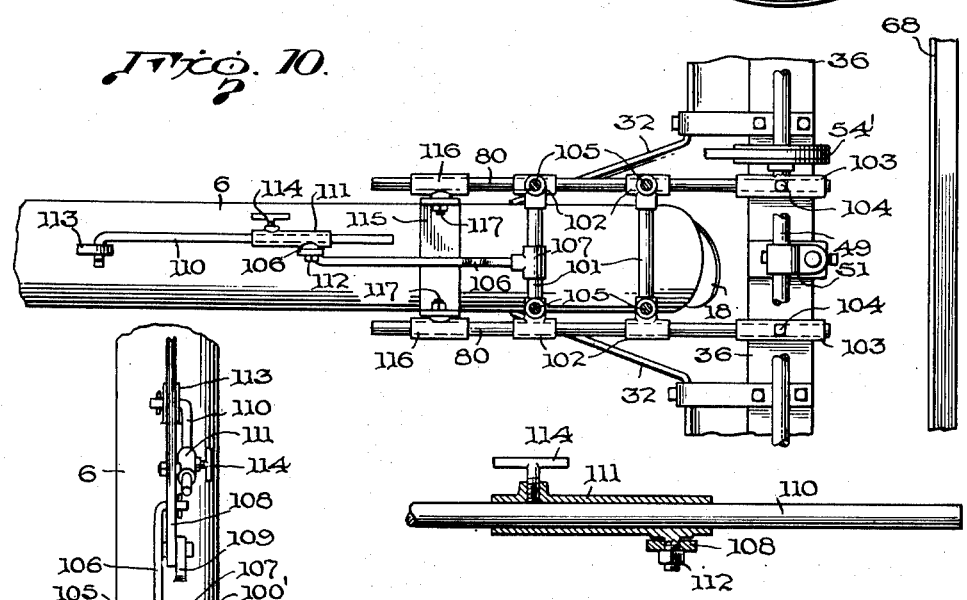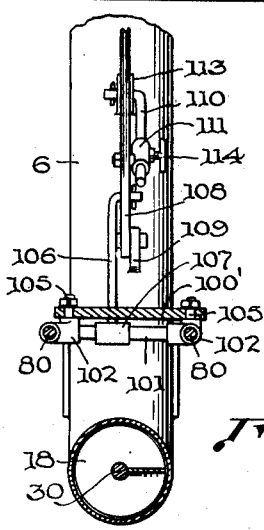

2,623,624

UNITED STATES PATENT OFFICE 2,623,624

LOADING CONVEYER FOR GRAIN AND OTHER MATERIALS

Arthur G. Slocum, Ensign, Kans.

Application March 17, 1950, Serial No. 150,149

4 Claims. (Cl. 198—9)

The present invention relates to material handling and loading equipment, and more especially to portable conveyors for handling and loading grain and other granular or bulk materials which often are piled on the ground or floor for subsequent transfer to trucks, bins, or other containers or transporting means.

More specifically, the present invention provides improvements over and modifications of, the material handling equipment described and claimed in my copending application Ser. No. 729,867, filed February 20, 1947, for Portable Conveyor for Grain and Other Materials, now Patent No. 2,528,917, issued November 7, 1950, but differs therefrom mainly in providing certain simple and light-weight portable conveyor or loading equipment for grain and the like which is designed to gather grain or equivalent materials which may be disposed in windrows on the ground or floor rather than in piles, as described in connection with the equipment of the aforesaid copending application, the present device being adapted to travel, or to be transported along, the windrows while gathering and conveying the grain so disposed and conveying it laterally from either or both directions to inclined or elevating means which act to convey such grain to the desired receiving instrumentalities therefor.

The improvements of the present invention reside specifically in the provision of simple and sturdy gathering means for windrow-type conveying or loading equipment, which means include attachment instrumentalities adapted to be provided across the front of such loading equipment, and which instrumentalities are attachable as a unit, and provide improved gathering conveyor means and associated parts that are adapted to gather the grain disposed in windrows and convey the gathered grain to a centrally disposed elevating or discharge conveyor, the gathering conveyor means of the said unit being operable either from the source of power (motor) which drives the elevating conveyor, or from a separate source of power if such be desirable or necessary, depending upon the particular type of equipment to which the improved unit of the invention may be attached.

A further object of the invention is to provide an attachment unit of the above-indicated character, which possesses full portability, which is easily handled and steered, and which may be adjusted vertically and laterally with respect to the ground and with respect to the discharge conveyor for efficient gathering of the grain.

A further object of the invention is to provide a construction of the above-indicated character wherein suitable adjustment is maintained readily and easily between the gathering conveyor and the driving means therefor, for assuring continuous and proper actuation of the gathering conveyor in all relative positions of adjustment of the unit.

A still further object of the invention is to provide a portable conveyor of the worm and tube type, which includes a main worm which normally is disposed with its longitudinal axis in an upwardly inclined position within a conveyor tube, and a separate auxiliary worm attachment extending laterally both to the right and to the left of the main worm, the said auxiliary worm comprising helically arranged vanes pitched in opposite directions with respect to the center of the auxiliary worm in such a manner as to gather up or drag the grain to the lower end of the main worm from either side thereof, or both sides simultaneously, so that the grain or other material will be conveyed or elevated by the main worm through the conveyor tube, both of the worms preferably being power-driven from a common source of power such as an engine of an internal combustion type suitably mounted on the tubular housing of the main conveyor worm, but wherein the auxiliary worm may be driven independently of the main or elevating worm by a separate source of power should the equipment be of a type requiring such a separate source of power.

A still further object of the invention is to provide improved guard instrumentalities for the said auxiliary worm, which instrumentalities cooperate with the said worm in gathering the windrowed grain or other material by guiding the same to the auxiliary worm during operation of the said equipment.

Further objects and advantages of the improved construction will become apparent as the description proceeds, and the features of novelty will be defined in particularity in the appended claims.

The accompanying drawings illustrate by way of example, representative forms of construction embodying the improvements of the present invention, it being understood that the illustrated constructions are intended to be considered only by way of exemplary embodiments of the present improvements, as obviously the inventive concept thereof admits of many variations in structural details falling within the scope of the appended claims.

In the drawings:

Fig. 1 represents a side elevation of the improved loading equipment, the view omitting, however, for the sake of clarity, one of the traction wheels on which the improved unit of the invention is mounted, and the view showing certain details of the drive and mounting means for the auxiliary or gathering conveyor worm forming a part of this invention, together with a source of power for the main worm, this source of power being common, in the form of construction of Fig. 1, to both the main and auxiliary conveyors;

Fig. 2 is a top plan view of the equipment shown in Fig. 1;

Fig. 3 is a vertical sectional view of this equipment, the view being taken on the line 3—3 of Fig. 2, looking in the direction of the arrows;

Fig. 4 is an enlarged front elevation of the auxiliary conveyor worm and associated mounting means therefor, showing structural details thereof;

Fig. 5 is a vertical section taken on the line 5—5 of Fig. 4, looking in the direction of the arrows;

Fig. 6 is a fragmentary horizontal sectional view of a portion of one end of the frame taken on the line 6—6 of Fig. 4, looking in the direction of the arrows, and showing in detail the mounting of an end traction wheel of the equipment;

Fig. 7 is a fragmentary top plan view of the mount for the driving instrumentalities for the equipment, the view illustrating the adjustability thereof;

Fig. 8 is a vertical section on the line 8—8 of Fig. 7;

Fig. 9 is an end view (side elevation) of a modified form of equipment, in which there is utilized a separate source of power for the auxiliary worm, certain of the parts being shown in section and others being partially broken away for clarity of illustration;

Fig. 10 is a fragmentary top plan view, taken generally along the line 10—10 of Fig. 9, looking in the direction of the arrows;

Fig. 11 is a vertical sectional view taken along the line 11—11 of Fig. 9, looking in the direction of the arrows; and Fig. 12 is a detailed horizontal sectional view taken on the line 12—12 of Fig. 9, looking in the direction of the arrows.

Figure 1:
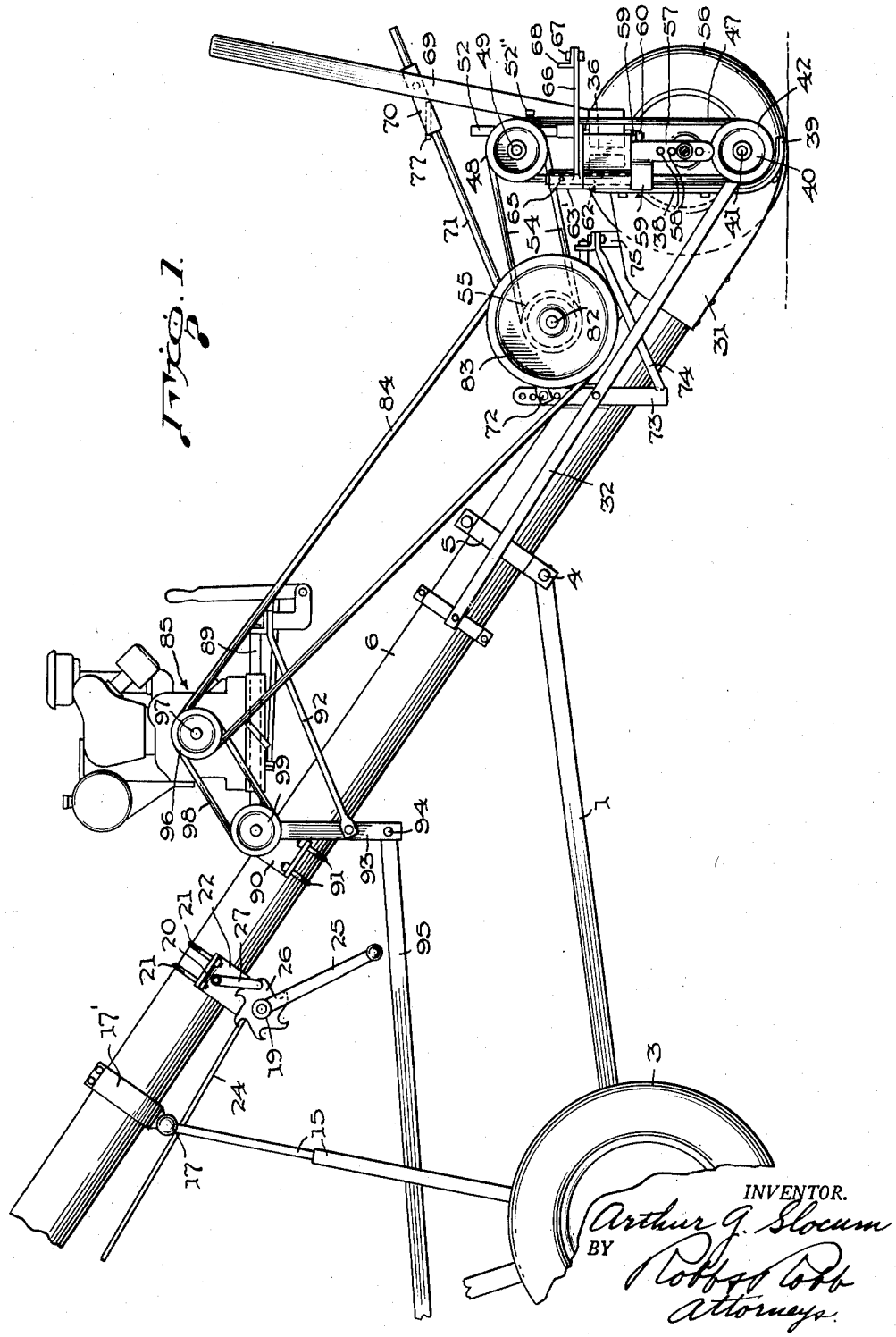

Referring more particularly to the drawings wherein like reference characters designate corresponding parts in the several figures of the drawings, reference numeral 1 indicates one of a pair of similar frame members arranged in forwardly converging relation, each of this pair of frame members having the form of an angle-iron or other suitable structural shape, these frame members 1 being connected in any suitable manner to a transversely extending axle, not shown, which axle maintains the frame members 1 substantially spaced apart and connected to the axle adjacent to the respective ends of the latter. Mounted on each end of the axle is a corresponding wheel, one of which is indicated at 3, the wheels 3 serving to facilitate movement of the wheeled frame from place to place, so as to dispose the conveyor mechanism carried by the frame, into whatever position may be desired. The wheeled frame may be moved either by manual force or it may be shifted from place to place by a tractor, team, or other motive power.

At the forward end of the frame 1, the frame members are pivotally connected at 4 to a split clamping band 5, which embraces and is clamped about a conveyor tube generally designated at 6.

Also in a manner analogous to that described in connection with the mounting instrumentalities for the conveyor tube 6, as described in my aforesaid copending application Ser. No. 729,867, now patent No. 2,528,917, are provided additional frame elements and associated parts, which include the telescopic brace or arm 15, the lower end of which is pivotally attached to the aforesaid axle, and the upper end of which is extended laterally and is rotatably received in a bushing or sleeve 17 which is disposed transversely across the bottom of the conveyor tube 6, and suitably secured thereto as by means of a split clamping band 17' to which the sleeve 17 is welded. This telescopic brace or arm 15 prevents lateral displacement of the conveyor tube 6 relative to its supporting frame, while at the same time allowing a change or adjustment of the inclination or elevation of the conveyor tube in which is mounted rotatably a main worm or screw conveyor 18 arranged coaxially therein and extending from a point somewhat beyond the forward end of the conveyor tube 6 to the upper or rear end thereof (see Fig. 3).

As has been described in the aforesaid copending application, adjustment of the angular position or elevation of the conveyor tube 6 and its worm 18 is effected by swinging the mounting frame about the axis of the pivotal connection thereof with the axle on which the wheels 3 are mounted, as described in the specification of the said copending aplication. Also, as described in detail therein for accomplishing this purpose, there is provided a winch, generally indicated at 19, which is attached in a suitable manner to the conveyor tube 6 by means of a strap 20 and tie-bolts 21 which embrace the conveyor tube. Welded or otherwise suitably secured to the strap 20 and depending therefrom in laterally spaced relation to each other are similar brackets, one of which is shown at 22, through the lower end of which is extended a winding drum or reel (not shown in the accompanying drawings, but which is shown and described in the copending application) on which there is wound a cable or rope 24, also shown and described in the said copending application. A crank lever 25 is provided for actuating this drum or reel so that it may be rotated manually in a convenient manner. A ratchet 26 and a coacting pawl 27 are provided for holding the said cable drum in any position of adjustment. The cable 24 is arranged as shown and described in the aforesaid copending application and is actuated as is described in detail therein.

It will be seen from the present drawings that the main worm or screw 18 projects forwardly somewhat beyond the forward lower end of the conveyor tube 6, so as to receive grain or similar material conveyed thereto by the auxiliary or gathering conveyor which will be described in detail hereinafter. This forward end of the conveyor has its shaft 30 rotatably supported or journaled in an open-ended housing 31 which is suitably secured to the forward end of the conveyor tube 6 and forms a diverging hood that encloses the end of the tube 6, the aperture of this hood being sufficiently large for free ingress of grain gathered by the auxiliary gathering conveyor. The upper rear end of the main conveyor shaft 30 is rotatably mounted in the upper end of the conveyor tube 6 as is shown and described in detail in the said copending application.

Specifically, the improvements of the present invention comprise the gathering unit that also is connected to and largely carried by the conveyor tube 6. This unit comprises a frame including similar divergingly disposed frame bars 32 which are secured at one end by bolts 34 to a split clamping band 33 that embraces the conveyor tube 6, the opposite ends 35 of which bars 32 are secured to the ends of the gathering unit which includes an I-beam 36, the web of which is disposed vertically and which extends longitudinally of the gathering assembly, and the top horizontal flange of which is secured to a horizontally extending portion 37 of an otherwise depending guard apron 38, the bottom portion of which is bent so as to extend below but adjacent to, the gathering conveyor or worm 40, as is indicated at 39. The worm 40 is mounted on a shaft 41 that carries end pulley sheaves 42 for rotation therewith, and is mounted in bearings 43 that are located in depending stem portions 44 of T-shaped bracket members, the horizontally disposed heads 45 of which are bolted as shown at 46 to the bottom flange of the I-beam 36.

The worm sheaves 42 are rotatably driven by pulley belts 47 that pass around the sheaves 42 and also around the driving sheaves 48 that are positioned vertically above the sheaves 42 and which are mounted on a continuous shaft 49 which extends the length of the machine. The shaft 49 rotates in bearings 50 that are formed in brackets 51 that are adjustably mounted on vertical studs 52 carried in sockets 52' positioned on the top horizontal flange of the I-beam 36. The position of adjustment of the shaft 49 is secured by set screws 52''. This driving shaft 49 is driven in turn by a pulley sheave 53 mounted on the shaft, which sheave 53 is rotated by a belt 54 that is driven by a drive pulley 55 on driving mechanism which will be referred to hereinafter in greater detail.

The frame assembly of the gathering unit is mounted for ready movement along the windrows on end wheels 56. These wheels are mounted on end plates 57 which depend from horizontal bracket arms 59 carried by the I-beam 36. A vertical series of holes 58 is provided in each of the end plates 57 for enabling a corresponding vertical adjustment of the wheels 56 relative to the ground, thereby enabling a raising and lowering of the apron blade and gathering conveyor worm 40, the wheels 56 having stub axles that are adapted to pass through the holes 58 and to be secured in desired adjustment by a nut 60 threadedly mounted on the axles of the wheels 56.

The bracket arms 59 are formed integrally into vertically disposed shaft members or studs 62 which extend upwardly into tubular bearings 63 which are secured to the I-beam 36 vertically across the ends thereof, the studs 62 being turnable relative to the sleeve bearings 63 for permitting alignment of the wheels 56 along a windrow of grain, the wheels being adjustable manually for assuming directional travel of the machine along the windrow of grain being gathered.

The conveyor worm shaft 41 is a continuous shaft extending longitudinally along the entire length of the machine. There is no interruption in the continuity of this shaft 41, but the helically-disposed conveyor vanes 64 and 64' are pitched in opposite directions on opposite sides of the main conveyor tube 6, so that the grain being gathered will be moved by the conveyor inwardly to the center thereof, that is to say, to the opening 64'' in the apron blade 38 that registers with the open end of the main conveyor tube 6 for permitting the grain being gathered to be picked up by the main conveyor worm 18. The housing 31 which is composed of vertical plates laterally disposed relative to the tube 6 at the lower open end thereof, inhibits entry of foreign materials such as dirt and trash to the main conveyor 18.

It will be seen from Fig. 1 of the drawings that the wheel mounting studs 62 are rigidly secured in sleeves 63' by the provision of set screws 65 which extend through the sleeves 63' into engagement with the studs 62. Also, welded or otherwise secured to the sleeves 63' are forwardly extending bracket arms 66 which have bolted thereto as indicated at 67, the angle beam or tie-bar 68 which is positioned in advance of the machine for tying the wheels together for simultaneous steering adjustment.

Steering adjustment of the wheels 56 is effected by a lever 68a pivotally attached at 68b to the tie-bar 68 and also at 68c to the I-beam 36, the rear end of the lever 68a being in turn pivotally connected at 68d to a sleeve 68e which is slidable on a rod 68f pivotally anchored at 68g to the beam 36. The sleeve 68e is provided with a set-screw 68h to lock the steering adjustment when set.

Also, there is mounted rigidly on the forward side of the vertically disposed web of the I-beam 36 at the mid-point thereof, a rocker lever 69 which is pivotally connected to a sleeve 70 that is slidably mounted upon and adjustable relatively to a bar 71, the inner end of which is secured by a bolt or the like 72 to an arm 73, the lower end of which is welded or otherwise secured to a brace bar 74, which, in turn, is secured to a vertically disposed bracket 75 which is welded or otherwise secured rigidly to the main conveyor tube 6. A series of holes 76 is provided in vertical alignment in the arm 73 for enabling adjustment of the bar 71, and a releasable set screw 77 is provided in the sleeve 70 for engagement with the arm 71.

It will be seen from Figs. 2 and 3 that an angle bar 78 extends across the main conveyor tube 6 adjacent to its intake opening. This angle bar 78 is mounted on the corresponding vertically disposed brackets 75 and overlies the end of the brace bar 74, a bolt 79 holding both the angle bar 78 and the brace bar 74 in place. This construction is duplicated on the opposite side of the main conveyor tube 6. The angle bar 78 extends transversely across the conveyor tube 6 and forms an end mounting for the front ends of the parallel arms 80 that are secured to the angle bar 78. The rear ends of the arms 80 are welded or otherwise secured to straps 73' at each side of the main tube 6, said straps being welded to the tube 6 and bolted to arms 73 to rigidly attach the mounting assembly to the tube 6.

These parallel arms 80 form mounting means for the driving instrumentalities for the gathering conveyor 40, which driving instrumentalities include the above-described pulley sheave 55 and belt 54. This sheave 55 is mounted on one end of a shaft 82 that extends transversely across the conveyor tube 6, the opposite end of the shaft 82 carrying a sheave 83 that is substantially larger in diameter than is sheave 55, being proportioned relative thereto for obtaining the desired speed ratio for the rotation of sheave 55, this latter sheave driving the gathering conveyor worm 40, as has been pointed out above. The sheave wheel 83 is driven in turn by a belt 84 that is actuated from the source of power 85 for the main conveyor, as will be pointed out hereinafter; this source of power being common to both the main conveyor 18 and to the auxiliary, or gathering, conveyor 40.

The shaft 82 is mounted in suitable supporting means 81, which is indicated diagrammatically in Fig. 3, the supporting means 81 being shown as being mounted on a plate 86 extending across the arms 80 and which in turn is indicated as being mounted on sleeves 87 that are adjustably mounted on the parallel arms 80, the position of adjustment being fixed by a set screw 88, so that proper tensioning of the belt 54 may be effected. If the drive through this belt 54 is to be interrupted during operation of the equipment, this can be effected by rocking the entire gathering unit by actuation of lever 69, there being sufficient play or lost motion between the gathering unit and the conveyor tube 6 to permit this rocking movement with attendant relatively slight variations in the distance between the end of the tube 8 and the gathering unit to permit loosening or tightening of the belt 54 without disturbing the position of the set screw 88. To effect this rocking movement and adjustment of belt 54, the set screw 77 in the sleeve 70 is released first, and tightened again when the desired tautness or looseness of the belt 54 is attained. During operation, the gathering conveyor 40 is driven at a constant and uniform speed.

As will be seen from Fig. 1, this auxiliary, or gathering conveyor, is driven by belt 84 that is actuated by a source of power, such as engine 85 of an internal combustion type, that actuates both the main and the gathering conveyors. The engine 85 is mounted on suitable mounting means 89 that are carried by a split clamping band 90 mounted on the conveyor tube 6 by the tie-bolts 91 and supported by brace bars 92 secured to arms 93 that are connected at 94 to bars 95 which are connected in turn to parts of the main frame, not shown, carried by the main axle of the machine, as will be apparent from the aforesaid copending application.

The engine 85 drives sheave 96 over which passes the above-mentioned driving belt 84, this sheave 96 being substantially smaller in diameter than the sheave 83, and is mounted on shaft 97. The engine 85 also drives a belt 98 which passes around the driving sheave 99 from which is operated the main conveyor in a well-understood manner.

In the modification of the equipment shown in Figs. 9-12, a separate engine 100 is employed for actuating the gathering conveyor. For this purpose, modified adjusting means are provided for adjusting the tension on the driving belt 54' for the auxiliary conveyor, which belt is similar to the above-described driving belt 54 and which actuates a driving sheave 48' in a similar manner.

The parallel bars 80, see Fig. 10, are reinforced by the transverse bars 101 that are slidably mounted on the bars 80 by the provision of T-connections 102 which are slidably adjustable along the bars 80, these latter bars being also longitudinally adjustable in sleeves 103, fixedly mounted on the I-beam 36, and provided with set screws 104 for holding the bars 80 in their proper setting adjustment. The T-connections 102 each carry a vertically extended stud bolt 105 on which the base plate 100' of the engine is mounted.

The rear cross bar 101 is connected to a link 106 by a T-connection, as is indicated at 107, the opposite end of the link 106 being hooked into a hole provided in a vertical lever 108 which is pivotally mounted at 109 on the conveyor tube 6. In order to lock the lever 108 in adjusted position on effecting back and forth adjustment of the link arm 106 and engine 100, there is provided a second link 110 having a sliding bushing 111 thereon, bolted as shown at 112 to the lever 108, and also pivotally anchored to the conveyor tube 6, as shown at 113, the bushing 111 being fastenable in desired position on the link 110 by a set screw 114. The arms 80 also are braced at their rear by transverse plate 115, connected to sliding bushings 116 by bolts 117, said plate 115 in turn being secured to vertical straps 118 welded to opposite sides of the main tube 6.

It is thought that the operation of these instrumentalities will be obvious from the drawings. In the form of construction shown in Figs. 9-12, the rocking lever 69 for the frame may be dispensed with, as the engine for driving the gathering conveyors is intended to be adjustable bodily, as described, so as to maintain proper tension on the drive belt 54, the sheave 119 for which is driven directly by the engine 100. The adjusting instrumentalities of the illustrated modifications are interchangeable, however, and either type may be used instead of the other. Except for the modified structure for mounting and adjusting the engine shown in Figs. 9-12, and the elimination of the lever 69, the construction of the gathering unit is unchanged, and therefore the same reference numerals have been used in Figs. 9-12 as are employed for corresponding parts in the construction shown in Figs. 1-8.

It will be apparent from the foregoing description that while the forms of construction specifically described and illustrated in the accompanying drawings represent desirable and practically operable embodiments of the invention, the structural details may be varied and modified without departing from the concept and spirit of the invention; and it will be understood, therefore, that it is intended and desired to embrace within the scope of this invention such modifications and changes as may be needed to adapt the construction to varying conditions and uses as defined by the appended claims.

What I claim is:

1. In a grain gathering machine including a main elevating conveyor, a tubular housing therefor, a mounting frame and transport means on which the said tubular housing is mounted, the improvements which comprise a gathering unit for gathering grain disposed in windrows, the said unit including frame instrumentalities connected to the said tubular conveyor housing, a gathering conveyor mounted on the frame instrumentalities and positioned adjacent to a ground surface for engaging the windrows of grain, comprising a rotary shaft extending longitudinally along the frame instrumentalities, conveyor means on the shaft arranged for progressively feeding grain from end portions of the conveyor shaft towards the central portion thereof, means adjacent to the central portion of the gathering conveyor providing ingress of gathered grain therefrom to the main elevating conveyor, driving mechanism for the gathering conveyor, including a driving shaft mounted on the frame instrumentalities and a source of power mounted on the said tubular housing, and means for effecting a relative rocking movement between the frame instrumentalities and the conveyor tube for effecting relative movement between the frame instrumentalities and the source of power for selectively maintaining and interrupting driving relation between the driving shaft and source of power, whereby adjustment of the driving mechanism is effected through lost-motion between the frame instrumentalities and the conveyor tube.

2. Portable conveying instrumentalities comprising, in combination, a main conveyor, a tubular housing for the main conveyor, an auxiliary conveyor disposed transversely of the main conveyor, mounting frame instrumentalities for the auxiliary conveyor, the said auxiliary conveyor comprising an elongated rotary helical conveyor having end portions adapted to gather material to be conveyed and having its discharge portion adjacent to the main conveyor intermediate its ends, means carried by the frame instrumentalities for guiding material being discharged therefrom to the main conveyor, means connecting the frame instrumentalities for the auxiliary conveyor to the tubular housing for the main conveyor, a source of power for the auxiliary conveyor mounted on the said tubular housing, a driving shaft for the auxiliary conveyor carried by the frame instrumentalities and extending longitudinally thereof, driving means operatively interconnecting the auxiliary conveyor and the driving shaft, the said driving shaft being positioned above the auxiliary conveyor, driving means interconnecting the source of power and the driving shaft, means for adjusting the source of power relative to the driving shaft and frame instrumentalities for maintaining a predetermined distance therebetween, and rocking means mounted on the frame instrumentalities for moving the said instrumentalities relative to the said tubular conveyor tube through lost-motion between the frame instrumentalities and the conveyor tube without disturbing the setting of the distance between the frame instrumentalities and driving shaft and the source of power for the driving shaft.

3. Portable conveying instrumentalities, comprising, in combination, a main conveyor, a tubular housing for the main conveyor, an auxiliary conveyor disposed transversely of the main conveyor, mounting frame instrumentalities for the auxiliary conveyor, means for flexibly attaching the auxiliary frame instrumentalities to the tubular housing for the main conveyor, a source of power for the auxiliary conveyor mounted on the said tubular housing, a continuous drive shaft for the auxiliary conveyor extending longitudinally of the frame instrumentalities above the auxiliary conveyor, spaced driving means for the auxiliary conveyor mounted on the driving shaft, means operatively interconnecting the driving means and the auxiliary conveyor, a driving sheave on the said driving shaft for receiving power from the said source of power, a second driving sheave on the source of power, a driving belt connecting the said second sheave with the driving sheave on the driving shaft, means for adjusting the source of power relative to the said frame instrumentalities for tightening the driving belt, locking means for the said adjusting means for securing the setting of the distance between the source of power and the frame instrumentalities, a rocker arm mounted on the frame instrumentalities for rocking the frame instrumentalities relative to the said tubular housing, a releasable locking bar interconnecting the rocker arm and tubular housing, a sleeve on the locking bar secured to the rocker arm, and releasable locking means mounted on the sleeve and releasably engaging the locking bar, the said rocker arm being releasable to enable rocking of the frame instrumentalities relative to the tubular conveyor housing through the flexible attaching means therebetween responsively to release of the locking means without change in position of the locking means for adjustment of the source of power, the said flexible attaching means permitting relative movement between the said auxiliary frame instrumentalities and the tubular conveyor housing for loosening the said driving belt when so desired.

4. A gathering conveyor unit for gathering grain and similar material, comprising a longitudinally extended beam, a ground-engaging wheel assembly pivotally mounted at each end of said beam, a tie-bar inter-connecting said wheels, a lever having one end pivotally connected to said tie-bar and being pivotally connected to said beam intermediate its ends for swinging said wheels on their pivots responsive to rocking movements of said lever, a rod connected at one end to said beam, means adjustably connecting the other end of said lever to said rod for locking said lever and said wheels in adjusted positions, a conveyor member operatively mounted on said beam, a driving shaft also operatively mounted on said beam, driving means inter-connecting said driving shaft and said conveyor member for driving the same, and means on said driving shaft for connection with a source of power to drive said driving shaft.

ARTHUR G. SLOCUM.

REFERENCES CITED

The following references are of record in the file of this patent:

UNITED STATES PATENTS

| Number | Name | Date |
| --- | --- | --- |
| 301,380 | Maltby | July 1, 1884 |
| 864,151 | Blaisdell | Aug. 27, 1907 |
| 1,197,345 | Cleven | Sept. 5, 1916 |
| 1,421,383 | Beardsley | July 4, 1922 |
| 1,629,918 | Kastler | May 24, 1927 |
| 1,798,315 | Donnan | Mar. 31, 1931 |
| 2,390,286 | Adams | Dec. 4, 1945 |
| 2,446,660 | Mulkey | Aug. 10, 1948 |
| 2,490,292 | Yost | Dec. 6, 1949 |
| 2,494,360 | Russell | Jan. 10, 1950 |
| 2,517,063 | Wallace | Aug. 1, 1950 |
| 2,528,917 | Slocum | Nov. 7, 1950 |